United States Patent
Kaul

(10) Patent No.: US 10,244,046 B2
(45) Date of Patent: Mar. 26, 2019

(54) MANAGING TRAFFIC AT A NODE WITHIN A WIRELESS COMMUNICATION NETWORK UPON THE NODE ENTERING SERVICE

(71) Applicant: T-Mobile USA, Inc., Bellevue, WA (US)

(72) Inventor: Mayank Kaul, Bellevue, WA (US)

(73) Assignee: T-Mobile USA, Inc., Bellevue, WA (US)

(*) Notice: Subject to any disclaimer, the term of this patent is extended or adjusted under 35 U.S.C. 154(b) by 100 days.

(21) Appl. No.: 15/362,520

(22) Filed: Nov. 28, 2016

(65) Prior Publication Data
US 2018/0152382 A1 May 31, 2018

(51) Int. Cl.
*H04L 12/801* (2013.01)
*H04L 12/803* (2013.01)
*H04L 29/08* (2006.01)
*H04W 12/06* (2009.01)

(52) U.S. Cl.
CPC ......... *H04L 67/1012* (2013.01); *H04W 12/06* (2013.01)

(58) Field of Classification Search
CPC ... H04W 48/06; H04W 84/045; H04W 88/08; H04W 72/1257; H04W 72/121
See application file for complete search history.

(56) References Cited

U.S. PATENT DOCUMENTS

| | | | | |
|---|---|---|---|---|
| 6,832,255 B1* | 12/2004 | Rumsewicz | ............ | H04L 29/06 709/224 |
| 6,839,767 B1* | 1/2005 | Davies | .................... | H04L 47/10 370/230 |
| 8,200,837 B1* | 6/2012 | Bhatti | ..................... | H04L 67/02 709/219 |
| 2004/0044772 A1* | 3/2004 | Harkin | .................. | H04L 63/083 709/227 |
| 2006/0002297 A1* | 1/2006 | Sand | ....................... | H04L 47/15 370/235 |
| 2010/0103831 A1* | 4/2010 | Caldwell | ............... | H04W 48/06 370/252 |
| 2010/0172288 A1* | 7/2010 | Vachhani | ................ | H04W 4/16 370/328 |
| 2011/0029686 A1* | 2/2011 | Sethi | ................... | H04L 12/5692 709/235 |
| 2011/0267944 A1* | 11/2011 | Stjernholm | ........... | H04L 47/824 370/230 |
| 2012/0051235 A1* | 3/2012 | Kotecha | ................ | H04W 76/50 370/252 |

(Continued)

*Primary Examiner* — Hoang-Chuong Q Vu
(74) *Attorney, Agent, or Firm* — Lee & Hayes, P.C.

(57) ABSTRACT

Nodes within a wireless communication network monitor themselves as they come back online after crashing, i.e., go back into service, or when they initially go into service. When the node is activated for service within the wireless communication network, the node has a predefined capacity of resources available to user devices at the node. Thus, when a node goes into service, the node may initially limit itself to utilizing only a portion of its capacity of resources. In other embodiments, the node may limit the user devices allowed to access the node to a particular number of user devices. After a predetermined amount of time, or once the node is stable, the node may allow for more user devices to access the node.

20 Claims, 5 Drawing Sheets

(56) References Cited

U.S. PATENT DOCUMENTS

| | | | |
|---|---|---|---|
| 2013/0084878 A1* | 4/2013 | Chen | H04W 72/10 |
| | | | 455/452.1 |
| 2013/0303182 A1* | 11/2013 | Chung | H04W 48/06 |
| | | | 455/453 |
| 2015/0036563 A1* | 2/2015 | Hurd | H04W 72/1252 |
| | | | 370/281 |
| 2015/0365890 A1* | 12/2015 | Rajendran | H04W 52/0206 |
| | | | 370/311 |
| 2016/0249302 A1* | 8/2016 | Uchiyama | H04J 11/0056 |
| 2016/0353261 A1* | 12/2016 | Thippesh | H04W 4/16 |
| 2017/0359751 A1* | 12/2017 | Lim | H04L 47/26 |
| 2017/0366576 A1* | 12/2017 | Donahue | H04L 43/062 |
| 2018/0110059 A1* | 4/2018 | Nagata | H04W 72/1289 |

* cited by examiner

MANAGING TRAFFIC AT A NODE WITHIN A WIRELESS COMMUNICATION NETWORK UPON THE NODE ENTERING SERVICE

BACKGROUND

In recent years, telecommunication devices have advanced from offering simple voice calling services within wireless communication networks to providing users with many new features. Telecommunication devices now provide messaging services such as email, text messaging, and instant messaging; data services such as Internet browsing; media services such as storing and playing a library of favorite songs; location services; and many others. Thus, telecommunication devices, referred to herein as mobile devices, are often used in multiple contexts. In addition to the new features provided by the telecommunication devices, users of such telecommunication devices have greatly increased. Such an increase in users is only expected to continue and in fact, it is expected that there could be a growth rate of twenty times more users in the next few years alone.

Nodes within the wireless communication networks can experience problems that can lead to an outage of services at the node. When the node becomes available again for services, the heavy demand for user traffic access at the node can cause the node to "crash," i.e. can lead to another outage of services at the node.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Figure 1:
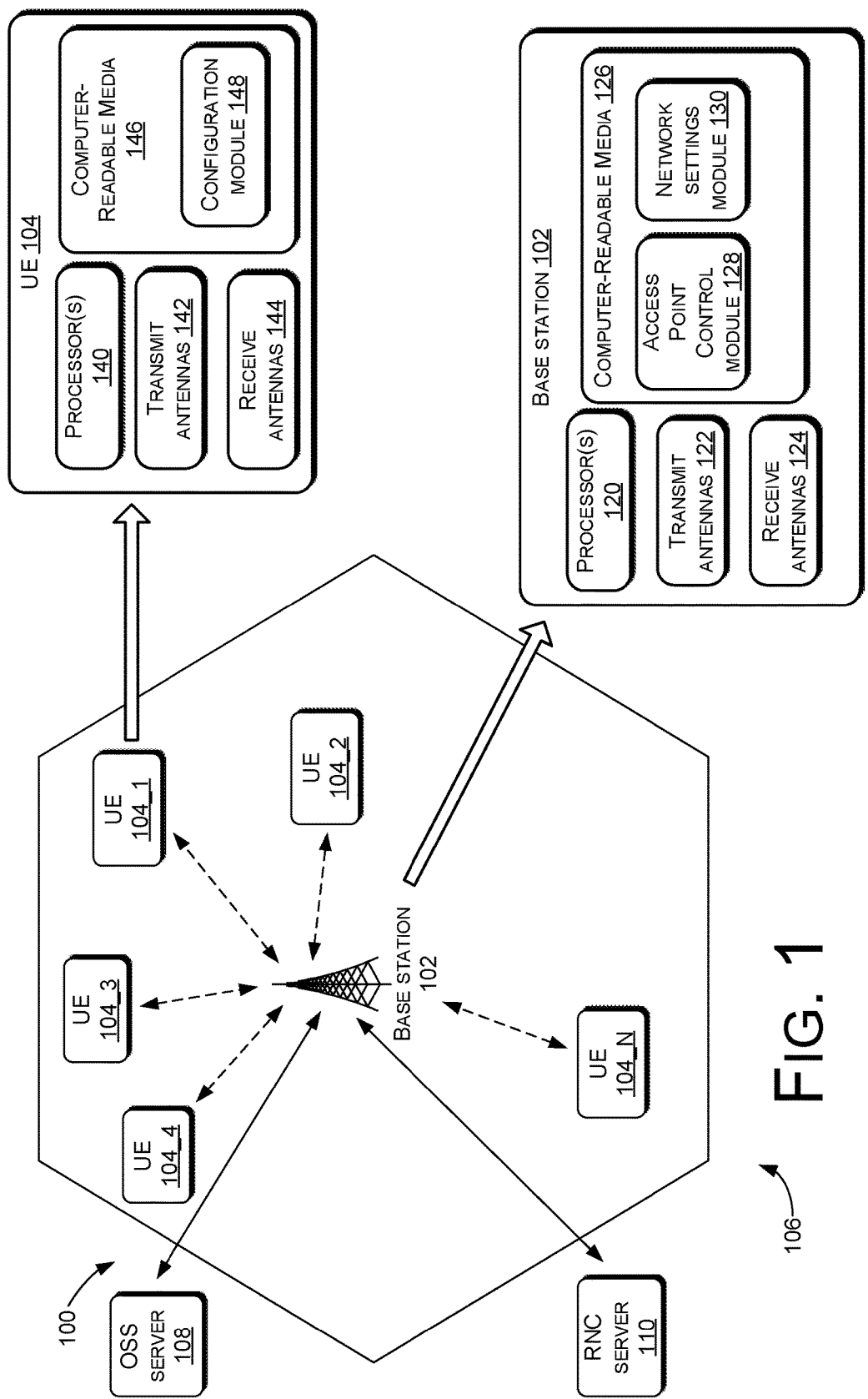
FIG. 1 schematically illustrates a wireless communication network, in accordance with various embodiments.

Described herein are techniques and an architecture for managing traffic at a node in a wireless communication network. In particular, the techniques and architecture described herein may be utilized to manage traffic in a node in a wireless communication network upon entry of the node into service within the wireless communication network. Such management of traffic at the node can help prevent the node from crashing, i.e., an outage of service provided by the node. For example, if the node does crash due to some problem and then once the problem is fixed, the node reenters service, then the deluge of traffic at the node can cause the node to crash once again.

In order for wireless communication networks to provide services to users via their user devices, multiple nodes within the wireless communication network handle traffic of user devices. The various nodes within the wireless communication network create an end-to-end path for user device traffic so that user devices can access services of the wireless communication network such as, for example, making phone calls, accessing networks such as the internet, etc. When a node is out of service, i.e., has crashed, upstream nodes cannot route user traffic through the node that is out of service. Thus, when a node is out of service, the end-to-end path provided by the nodes is disrupted. For example, an enodeB or radio network controller may need to provide user traffic to a mobility management entity (MME) node. The enodeB and MME nodes provide different functions to user devices. Thus, for example, if the MME node is out of service, then the enodeB cannot route user device traffic to the MME node. Once the MIME node comes back into service, the enodeB node will attempt to route traffic to the MME node. This can result in bombardment of the MME node with traffic, which may overwhelm the MME node. Such overloading of the MME node may cause the MME node to crash once again.

Accordingly, in accordance with embodiments, nodes within the wireless communication network monitor themselves as they come back online after crashing, i.e., go back into service, or when they initially go into service. When the node is activated for service within the wireless communication network, the node has a predefined capacity of resources available to user devices at the node. Such resources include, for example, a pool of resources such as, for example, digital signal processing (DSP) resources and/or central processing unit (CPU) resources, etc. to handle calls/transactions.

In embodiments, when a node goes into service, the node may initially limit itself to utilizing only a portion of its capacity of resources. For example, the node may only allow 10% of its resources to initially be utilized by user devices. Thus, user devices that attempt to access the node may be provided with an error once 10% of capacity has been reached at the node. In other embodiments, the node may limit the user devices allowed to access the node to a number of user devices. For example, initially the node may only allow the first 100 user devices to access the node.

After a predetermined amount of time, the node may allow for more user devices to access the node. For example, after the initial 10% of capacity is realized, the node may allow another 20% of resources to be utilized thereby bringing the total of resources utilized to 30%. In other embodiments, after the first 100 user devices have accessed the node, after a predetermined amount of time, the node may allow for 200 more user devices to access the node.

Thus, the node may control or manage use of its resources available and slowly ramp up to full or almost full capacity in its utilization of resources. As more and more user devices access the node, the node will continue to monitor itself for errors and/or problems in determining when and/or how many more user devices to allow to access the node. In order to manage the amount of user device traffic allowed to access the node, the node may utilize various techniques such as, for example, tokens provided to user devices, one or more counters, etc.

FIG. 1 illustrates a wireless communication network 100 (also referred to herein as network 100). The network 100 comprises a base station (BS) 102 communicatively coupled to a plurality of user devices, referred to as UEs 104_1, 104_2, ..., 104_N, where N is an appropriate integer. The BS 102 serves UEs 104 located within a geographical area, e.g., within a macro cell 106. FIG. 1 illustrates the macro cell 106 to be hexagonal in shape, although other shapes of the macro cell 106 may also be possible. In general, the network 100 comprises a plurality of macro cells 106, with each macro cell 106 including one or more BSs 102.

In an embodiment, the UEs 104_1, ..., 104_N may comprise any appropriate devices for communicating over a wireless communication network. Such devices include mobile telephones, cellular telephones, mobile computers, Personal Digital Assistants (PDAs), radio frequency devices, handheld computers, laptop computers, tablet computers, desktop computers, palmtops, pagers, devices configured as IoT devices, integrated devices combining one or more of the preceding devices, and/or the like. As such, UEs 104_1, ..., 104_N may range widely in terms of capabilities and features. For example, one of the UEs 104_1, ..., 104_N may have a numeric keypad, a capability to display only a few lines of text and be configured to interoperate with only Global System for Mobile Communications (GSM) networks. However, another of the UEs 104_1, ..., 104_N (e.g., a smart phone) may have a touch-sensitive screen, a stylus, an embedded GPS receiver, and a relatively high-resolution display, and be configured to interoperate with multiple types of networks. UEs 104_1, ..., 104_N may also include SIM-less devices (i.e., mobile devices that do not contain a functional subscriber identity module ("SIM")), roaming mobile devices (i.e., mobile devices operating outside of their home access networks), and/or mobile software applications.

In an embodiment, the BS 102 may communicate voice traffic and/or data traffic with one or more of the UEs 104_1, ..., 104_N. The BS 102 may communicate with the UEs 104_1, ..., 104_N using one or more appropriate wireless communication protocols or standards. For example, the BS 102 may communicate with the UEs 104_1, ..., 104_N using one or more standards, including but not limited to GSM, Time Division Multiple Access (TDMA), Universal Mobile Telecommunications System (UMTS), Evolution-Data Optimized (EVDO), Long Term Evolution (LTE), Generic Access Network (GAN), Unlicensed Mobile Access (UMA), Code Division Multiple Access (CDMA) protocols (including IS-95, IS-2000, and IS-856 protocols), Advanced LTE or LTE+, Orthogonal Frequency Division Multiple Access (OFDM), General Packet Radio Service (GPRS), Enhanced Data GSM Environment (EDGE), Advanced Mobile Phone System (AMPS), WiMAX protocols (including IEEE 802.16e-2005 and IEEE 802.16m protocols), High Speed Packet Access (HSPA), (including High Speed Downlink Packet Access (HSDPA) and High Speed Uplink Packet Access (HSUPA)), Ultra Mobile Broadband (UMB), and/or the like.

The BS 102 may be communicatively coupled (e.g., using a backhaul connection, illustrated using solid lines in FIG. 1) to a number of backhaul equipment, e.g., an operation support subsystem (OSS) server 108, a radio network controller (RNC) 110, and/or the like. The RNC 110 generally serves as a gateway for the wireless communication network 100 and can also be in the form of a mobility management entity when the wireless communication network 100 operates according to the long term evolution (LTE) standard or LTE Advanced standard.

In an embodiment, the base station 102 may comprise processors 120, one or more transmit antennas (transmitters) 122, one or more receive antennas (receivers) 124, and computer-readable media 126. The processors 120 may be configured to execute instructions, which may be stored in the computer-readable media 126 or in other computer-readable media accessible to the processors 120. In some embodiments, the processors 120 are a central processing unit (CPU), a graphics processing unit (GPU), or both CPU and GPU, or any other sort of processing unit. The base station 102 can also be in the form of a Node B (where the wireless communication network 100 is 3G UMTS network) or in the form of an enodeB (where the wireless communication network 100 operates according to the LTE standard or LTE Advanced standard).

The one or more transmit antennas 122 may transmit signals to the UEs 104_1, ..., 104_N, and the one or more receive antennas 124 may receive signals from the UEs 104_1, ..., 104_N. The antennas 122 and 124 include any appropriate antennas known in the art. For example, antennas 122 and 124 may include radio transmitters and radio receivers that perform the function of transmitting and receiving radio frequency communications. In an embodiment, the antennas 122 and 124 may be included in a transceiver module of the BS 102.

The computer-readable media 126 may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by the base station 102. The computer-readable media 126 may reside within the base station 102, on one or more storage devices accessible on a local network to the base station 102, on cloud storage accessible via a wide area network to the base station 102, or in any other accessible location.

The computer-readable media 126 may store modules, such as instructions, data stores, and so forth that are configured to execute on the processors 120. For instance, the computer-readable media 126 may store an access point control module 128 and a network settings module 130, as will be discussed in more detail herein later.

Although FIG. 1 illustrates the computer-readable media 126 in the BS 102 storing the access point control module 128 and the network settings module 130, in various other embodiments, the access point control module 128, the network settings module 130, and one or more other modules (not illustrated, may be stored in another component of the network 100 (e.g., other than the BS 102). For example, one or more of these modules may be stored in a computer-readable media included in the OSS server 108, the RNC 110, another appropriate server associated with the network 10, and/or the like.

Although not illustrated in FIG. 1, various other modules (e.g., an operating system module, basic input/output systems (BIOS), etc.) may also be stored in the computer-readable media 126. Furthermore, although not illustrated in FIG. 1, the base station 102 may comprise several other components, e.g., a power bus configured to supply power to various components of the base station 102, one or more interfaces to communicate with various backhaul equipment, and/or the like.

In an embodiment, the UEs 104 may comprise processors 140, one or more transmit antennas (transmitters) 142, one or more receive antennas (receivers) 144, and computer-readable media 146. The processors 140 may be configured to execute instructions, which may be stored in the computer-readable media 146 or in other computer-readable media accessible to the processors 140. In some embodiments, the processors 140 is a central processing unit (CPU), a graphics processing unit (GPU), or both CPU and GPU, or any other sort of processing unit. The one or more transmit antennas 142 may transmit signals to the base station 102, and the one or more receive antennas 144 may receive signals from the base station 102. In an embodiment, the antennas 142 and 144 may be included in a transceiver module of the UE 104.

The computer-readable media 146 may also include CRSM. The CRSM may be any available physical media accessible by a computing device to implement the instructions stored thereon. CRSM may include, but is not limited to, RAM, ROM, EEPROM, a SIM card, flash memory or other memory technology, CD-ROM, DVD or other optical disk storage, magnetic cassettes, magnetic tape, magnetic disk storage or other magnetic storage devices, or any other medium which can be used to store the desired information and which can be accessed by the UE 14.

The computer-readable media 146 may store several modules, such as instructions, data stores, and so forth that are configured to execute on the processors 140. For instance, the computer-readable media 140 may store a configuration module 148. Although not illustrated in FIG. 1, the computer-readable media 146 may also store one or more applications configured to receive and/or provide voice, data and messages (e.g., short message service (SMS) messages, multi-media message service (MMS) messages, instant messaging (IM) messages, enhanced message service (EMS) messages, etc.) to and/or from another device or component (e.g., the base station 102, other UEs, etc.).

Although not illustrated in FIG. 1, the UEs 104 may also comprise various other components, e.g., a battery, a charging unit, one or more network interfaces, an audio interface, a display, a keypad or keyboard, a GPS receiver and/or other location determination component, and other input and/or output interfaces.

Although FIG. 1 illustrates only one UE (UE 104_1) in detail, each of the UEs 104_2, ..., 104_N may have a structure that is at least in part similar to that of the UE 104_1. For example, similar to the UE 104_1, each of the UEs 104_2, ..., 104_N may comprise processors, one or more transmit antennas, one or more receive antennas, and computer-readable media including a configuration module.

In an embodiment, the network settings module 130 stored in the computer-readable media 126 maintains a plurality of network settings associated with the network 10. Individual network settings maintained by the network settings module 130 may be pertinent to a single UE of the UEs 104_1, ..., 104_N, a subset of the UEs 104_1, ..., 104_N, or each of the UEs 104_1, ..., 104_N. For example, a network setting of the plurality of network settings may specify a maximum bit rate at which a UE (or each of the UEs 104_1, ..., 104_N) may transmit data to the BS 102. Another network setting of the plurality of network settings may specify a transmit time interval (tti) used by each of the UEs 104_1, ..., 104_N to transmit data to the BS 102. Yet another network setting of the plurality of network settings may specify a maximum power that each of the UEs 104_1, ..., 104_N may use to transmit data to the BS 102.

The plurality of network settings maintained by the network settings module 130 may also include any other appropriate type of network settings.

In an embodiment, one or more of the plurality of network settings maintained by the network settings module 130 may be communicated to the UEs 104_1, ..., 104_N (e.g., by the transmit antennas 122 to the receive antennas 144 of the UEs 104_1, ..., 104_N). Based on receiving the network settings, the UEs 104_1, ..., 104_N (e.g., the corresponding configuration modules 148) may configure themselves and communicate with the BS 102 accordingly.

Figure 2:
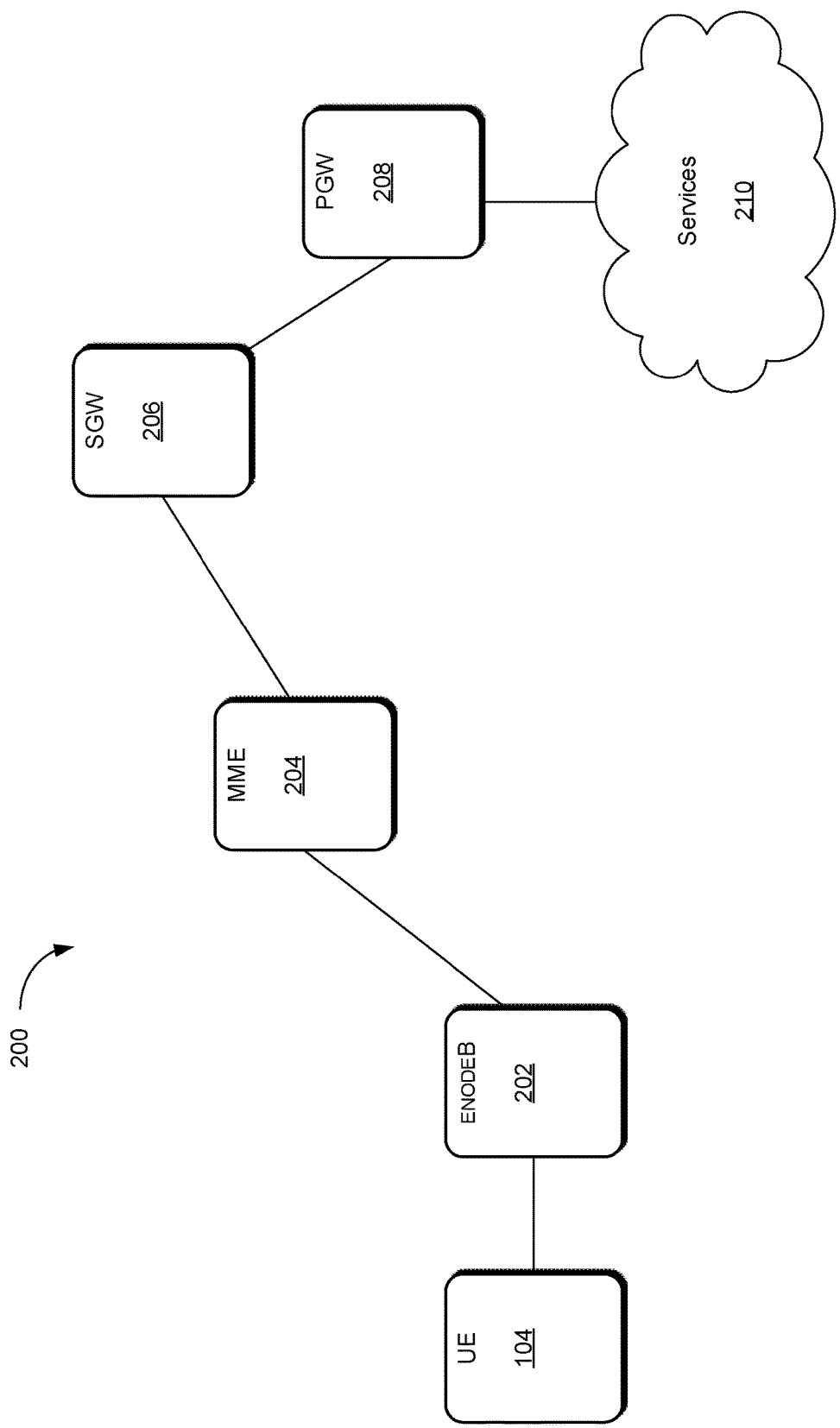
FIG. 2 schematically illustrates an example of several nodes within the wireless communication network 100 of FIG. 1.

FIG. 2 schematically illustrates an example 200 of several nodes 202, 204, 206 and 208 within the wireless communication network 100. As is known, the wireless communication network 100 generally comprises more than four nodes but only four nodes have been illustrated for clarity. As can be seen in the example of FIG. 2, the nodes include an enodeB node 202, a mobility management entity (MME) node 204, a serving gateway (SGW) node 206 and a PDN gateway (PGW) node 208. These nodes provide an end to end path for UEs 104 and can be accessed to provide various services 210 to a UE 104 within the wireless communication network 100. For example, the nodes can define a path for a user device to obtain various services 210 such as, for example, placing telephone calls, accessing a network such as the Internet, etc.

In embodiments, traffic in one of the nodes 202, 204, 206 and 208 is managed upon entry of the particular node into service within the wireless communication network 100. Such management of traffic at the particular node can help prevent the node from crashing, i.e., an outage of service provided by the particular node. For example, if the particular node crashes due to some problem and then once the problem is fixed, the particular node reenters service, then the deluge of traffic at the particular node can cause the particular node to crash once again.

More particularly, when a particular node is out of service, i.e., has crashed, upstream nodes cannot route UE traffic through the node that is out of service. Thus, when a node is out of service, the end-to-end path provided by the nodes is disrupted. For example, the enodeB node 202 may need to provide user traffic from UEs 104 to the MME node 204. The enodeB and MME nodes 202, 204 provide different functions to UEs 104. Thus, for example, if the MME node 204 is out of service, then the enodeB node 202 cannot route UE traffic to the MME node 204. Once the MME node 204 comes back into service, the enodeB node 202 will attempt to route UE traffic to the MME node 204. This can result in bombardment of the MME node 204 with UE traffic, which may overwhelm the MME node 204. Such overloading of the MME node 204 may cause the MME node 204 to crash once again.

Accordingly, in accordance with embodiments, nodes, e.g., nodes 202, 204, 206 and 208 within the wireless communication network 100 monitor themselves as they come back online after crashing, i.e., go back into service, or when they initially go into service. For example, when MME node 204 is activated for service within the wireless communication network 100, the MME node 204 has a predefined capacity of resources available to UEs 104 at the MME node 204. Such resources include, for example, a pool of resources such as, for example, digital signal processing (DSP) resources and/or central processing unit (CPU) resources, etc., to handle calls/transactions.

In embodiments, when the MME node 204 goes into service, the MME node 204 may initially limit itself to utilizing only a portion of its capacity of resources. For example, the MME node 204 may only allow 10% of its resources to initially be utilized by UEs 104. Thus, subsequent UEs 104 that attempt to access the MME node 204 may be denied access and may be provided with an error once 10% of capacity has been reached at the MME node 204. In other embodiments, the MME node 204 may limit the number of UEs 104 allowed to access the MME node 204 to a predefined number of UEs 104. For example, initially the MME node 204 may only allow the first 100 UEs 104 to access the node. Subsequent UEs 104 that attempt to access the MME node 204 may be denied access and may be provided with an error once the initial 100 UEs 104 have accessed the MME node 204.

After a predetermined amount of time or once the MME node 204 is relatively stable, the MME node 204 may allow for more UEs 104 to access the MME node 204. For example, after the initial 10% of capacity is realized, the MME node 204 may allow another 20% of resources to be utilized, thereby bringing the total of resources utilized to 30%. In other embodiments, after the first 100 user devices have accessed the MME node 204, after a predetermined amount of time or once the MME node 204 is relatively stable, the MME node 204 may allow for 200 more UEs 104 to access the MME node 204. The MME node 204 can continue to increase access of UEs 104 by increasing the percentage of resources available to UEs 104 or increasing the number of UEs 104 allowed to access the MME node 204. The increase may be, for example, a consistent amount, e.g., always increasing by a set amount of percentage or a set number, or may be by doubling, tripling, etc. the percentage or number.

Thus, the MME node 204 may control or manage use of its resources available and slowly ramp up to full or almost full capacity in its utilization of its resources. As more and more UEs 104 access the MME node 204, the MME node 204 will continue to monitor itself for errors and/or problems in determining when and/or how many more UEs 104 to allow to access the MME node 204. In order to manage the amount of UE traffic allowed to access the MME node 204, the MME node 204 may utilize various techniques such as, for example, tokens provided to UEs 104, one or more counters, etc. The tokens may be provided to the UEs 104 prior to the MME node 204 leaving service. Based upon the number of tokens already received from UEs 104 allowed to access the MME node 204 or based upon counters indicating reaching a current limit of UEs 104 accessing the MME node 204, further UEs 104 may be prevented from accessing the MME node 204 until the current capacity or limit is increased. In embodiments, tokens at UEs 104 may be prioritized to allow higher prioritized UEs 104 access to the MME node 204.

Additionally, generally when a UE 104 accesses a network, the UE 104 sends a request to the network, after which the UE 104/user is authenticated by the network. An end-to-end tunnel is then created for the user to have access to services provided by the network. Thus, the network that includes the MME node 204 may only allow a certain number of UEs 104 to access the MME node 204. Similarly, individual messaging that UEs 104 might use to register onto a network may be limited, or the process of authentication itself may be limited. For example, there are messages exchanged between the MME node 204 and the enodeB node 202 for authentication. Accordingly, techniques described herein also apply to the use case when enodeB node 202 requests the MME node 204 for authentication and the MME node 204 is just getting into service. The MME node 204 may block further authentication of UEs 104 at the enodeB node 202. The MME node 204 can block authentication of more UEs 104 based upon tokens already received from authenticated UEs 104 or based upon counters indicating reaching a current limit of UEs 104. Thus, in embodiments, other nodes may monitor and/or control access of UE traffic to nodes.

While rare, two or more nodes may go out of service at the same time. In such circumstances, the upstream node may be the only node that controls access of UEs 104 to itself as this will serve as the control or throttling of downstream nodes. For example, if the MME node 204 and the PGW node 208 both go out of service, then once the MME node 204 is back in service, the MME node's control of UE traffic at the MME node 204 will control UE traffic at the SGW node 206 and the PGW node 208

Figure 3:
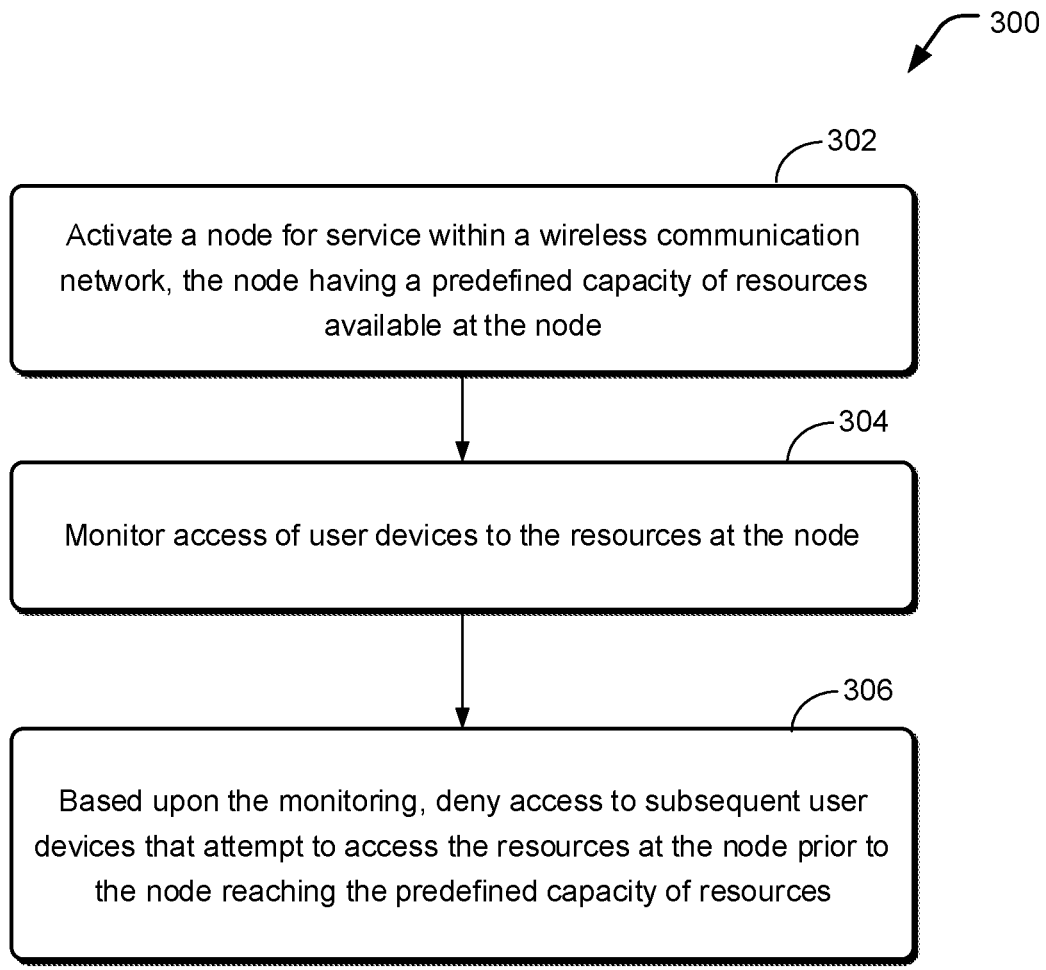
FIG. 3 is a flowchart illustrating an example method of managing traffic at a node in the wireless communication network of FIG. 1, in accordance with various embodiments.

FIG. 3 is a flowchart illustrating a method 300 of managing traffic at a node in a wireless communication network, e.g., wireless communication network 100 of FIG. 1 and nodes 202, 204, 206 and 208 of FIG. 2. As illustrated, at block 302, a node is activated for service within the wireless communication network. The node has a predefined capacity of resources available at the node. At block 304, access of user devices to the resources at the node is monitored. At block 306, based upon the monitoring, access to subsequent user devices that attempt to access the resources at the node is denied prior to the node reaching the predefined capacity of resources.

Figure 4:
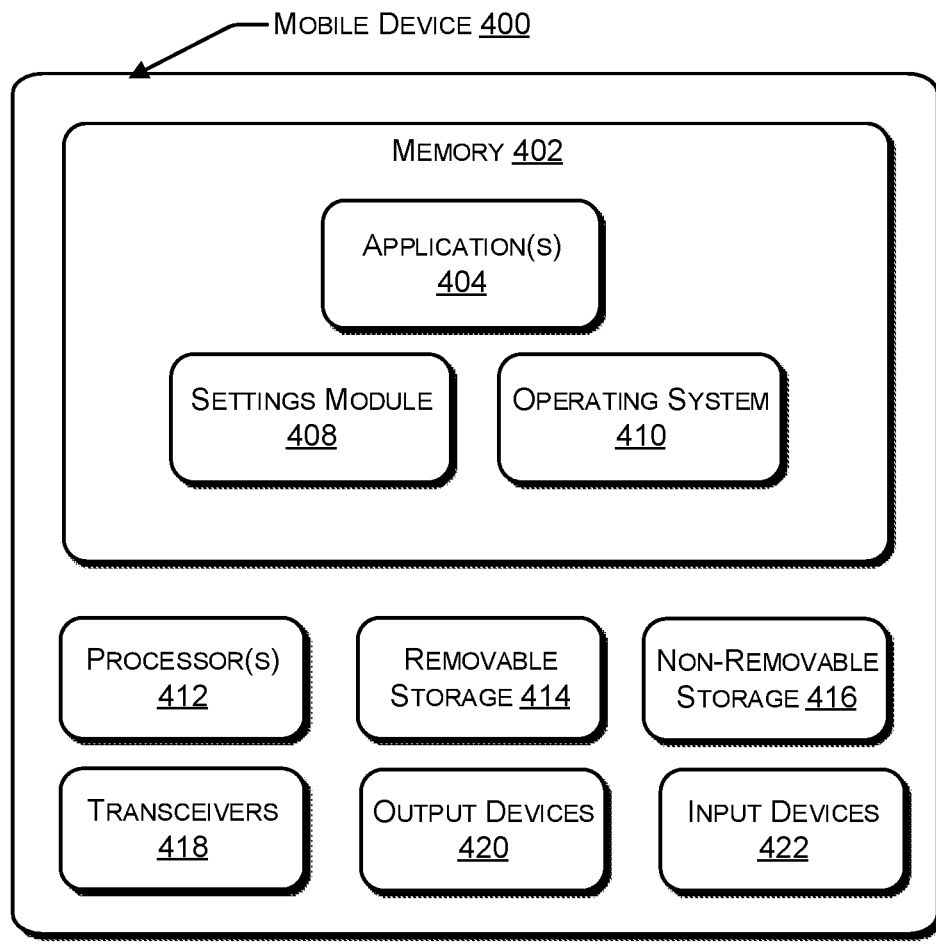
FIG. 4 illustrates a component level view of an example mobile device configured for use in the wireless communication network of FIG. 1.

FIG. 4 illustrates a component level view of a mobile device 400, such as UE 104, configured to function within wireless communication network 100. As illustrated, the mobile device 400 comprises a system memory 402 storing application(s) 404, a settings module 408, and an operating system 410. Also, the mobile device 400 includes processor(s) 412, a removable storage 414, a non-removable storage 416, transceivers 418, output device(s) 420, and input device(s) 422. In various implementations, system memory 402 is volatile (such as RAM), non-volatile (such as ROM, flash memory, etc.) or some combination of the two. In some implementations, the processor(s) 412 is a central processing unit (CPU), a graphics processing unit (GPU), or both CPU and GPU, or any other sort of processing unit.

The mobile device 400 may also include additional data storage devices (removable and/or non-removable) such as, for example, magnetic disks, optical disks, or tape. Such additional data storage may include removable storage 414 and non-removable storage 416.

Non-transitory computer-readable media may include volatile and nonvolatile, removable and non-removable tangible, physical media implemented in technology for storage of information, such as computer readable instructions, data structures, program modules, or other data. System memory 402, removable storage 414 and non-removable storage 416 are all examples of non-transitory computer-readable media. Non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the user device 400. Any such non-transitory computer-readable media may be part of the user device 400.

In some implementations, the transceivers 418 include any sort of transceivers known in the art. For example, the transceivers 418 may include a radio transceiver that performs the function of transmitting and receiving radio frequency communications via an antenna. Also or instead, the transceivers 418 may include wireless modem(s) to may facilitate wireless connectivity with other computing devices. Further, the transceivers 418 may include wired communication components, such as an Ethernet port, for communicating with other networked devices.

In some implementations, the output devices 420 include any sort of output devices known in the art, such as a display (e.g., a liquid crystal display), speakers, a vibrating mechanism, or a tactile feedback mechanism. Output devices 420 also include ports for one or more peripheral devices, such as headphones, peripheral speakers, or a peripheral display.

In various implementations, input devices 422 include any sort of input devices known in the art. For example, input devices 422 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Figure 5:
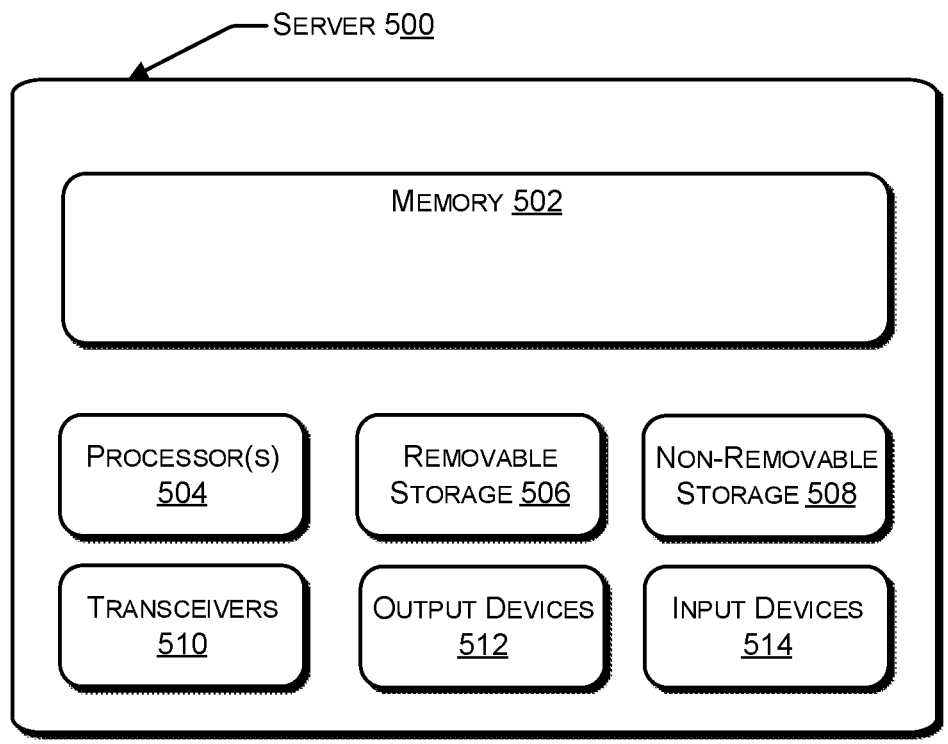
FIG. 5 illustrates a component level view of a server configured for use in the arrangement of FIG. 1 to provide various services of the wireless communication network of FIG. 1.

FIG. 5 illustrates a component level view of a server configured for use within a wireless communication network, e.g., wireless communication network 100 in order to provide various services within the wireless communication network, according to the techniques described herein. The server 500 may be located in the RNC or gateway 110. Additionally, the server 500 may be a separate entity located separately from the RNC 110. As illustrated, the server 500 comprises a system memory 502. Also, the server 500 includes processor(s) 504, a removable storage 506, a non-removable storage 508, transceivers 510, output device(s) 512, and input device(s) 514.

In various implementations, system memory 502 is volatile (such as RAM), non-volatile (such as ROM, flash memory, etc.) or some combination of the two. In some implementations, the processor(s) 504 is a central processing unit (CPU), a graphics processing unit (GPU), or both CPU and GPU, or any other sort of processing unit.

The server 500 may also include additional data storage devices (removable and/or non-removable) such as, for example, magnetic disks, optical disks, or tape. Such additional storage is illustrated in FIG. 5 by removable storage 506 and non-removable storage 508.

Non-transitory computer-readable media may include volatile and nonvolatile, removable and non-removable tangible, physical media implemented in technology for storage of information, such as computer readable instructions, data structures, program modules, or other data. System memory 502, removable storage 506 and non-removable storage 508 are all examples of non-transitory computer-readable media. Non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the server 500. Any such non-transitory computer-readable media may be part of the server 500.

In some implementations, the transceivers 510 include any sort of transceivers known in the art. For example, the transceivers 510 may include wired communication components, such as an Ethernet port, for communicating with other networked devices. Also or instead, the transceivers 510 may include wireless modem(s) to may facilitate wireless connectivity with other computing devices. Further, the transceivers 510 may include a radio transceiver that performs the function of transmitting and receiving radio frequency communications via an antenna.

In some implementations, the output devices 512 include any sort of output devices known in the art, such as a display (e.g., a liquid crystal display), speakers, a vibrating mechanism, or a tactile feedback mechanism. Output devices 512 also include ports for one or more peripheral devices, such as headphones, peripheral speakers, or a peripheral display.

In various implementations, input devices 514 include any sort of input devices known in the art. For example, input devices 514 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

I claim:

1. A method of managing traffic at a node in a wireless communication network, the method comprising:
   activating the node for service within the wireless communication network, the node having a predefined capacity of resources available at the node;
   selecting, upon the activating, a first threshold portion of the predefined capacity of resources;
   granting access to the node to user devices until a used portion of the predefined capacity of resources reaches the first threshold portion, and thereafter denying access to subsequent user devices that attempt to access the node for a period of time;
   selecting, after the period of time, a second threshold portion of the predefined capacity of resources that is greater than the first threshold portion; and
   granting, after selecting the second threshold portion, access to the node until the used portion of the predefined capacity of resources reaches the second threshold portion, and thereafter denying access to additional subsequent user devices that attempt to access the node.

2. The method of claim 1, wherein denying access to subsequent user devices comprises sending an error message to the subsequent user devices.

3. The method of claim 1, wherein the first threshold portion is a first number of user devices.

4. The method of claim 3, wherein the second threshold portion is a second number of user devices.

5. The method of claim 1, wherein the first threshold portion is a first percentage of the predefined capacity of resources available at the node.

6. The method of claim 5, wherein the second threshold portion is a second percentage of the predefined capacity of resources available at the node.

7. The method of claim 1, further comprising periodically granting access to at least some of the additional subsequent user devices based on one or more additional threshold portions, each of the one or more additional threshold portions being greater than preceding threshold portions, until the used portion of the predefined capacity of resources available at the node reaches a maximum portion of the predefined capacity of resources.

8. The method of claim 1, further comprising providing the user devices that have been granted access to the node with a token indicating that the user devices have been granted access to the node.

9. An apparatus comprising:
a non-transitory storage medium; and
instructions stored in the non-transitory storage medium, the instructions being executable by one or more processors of the apparatus to:
activate a node for service within a wireless communication network, the node having a predefined capacity of resources available at the node;
select, upon the activating, a first threshold portion of the predefined capacity of resources;
grant access to the node user devices until a used portion of the predefined capacity of resources reaches the first threshold portion, and thereafter deny access to subsequent user devices that attempt to access the node for a period of time;
select, after the period of time, a second threshold portion of the predefined capacity of resources that is greater than the first threshold portion; and
grant, after selecting the second threshold portion, access to the node until the used portion of the predefined capacity of resources reaches the second threshold portion, and thereafter deny access to additional subsequent user devices that attempt to access the node.

10. The apparatus of claim 9, wherein denying access to subsequent user devices comprises sending an error message to the subsequent user devices.

11. The apparatus of claim 9, wherein the first threshold portion is a first number of user devices.

12. The apparatus of claim 11, wherein the second threshold portion is a second number of user devices allowed to access the resources of the node.

13. The apparatus of claim 9, wherein the first threshold portion is a first percentage of the predefined capacity of resources available at the node and the second threshold portion is a second percentage of the predefined capacity of resources available at the node.

14. The apparatus of claim 9, wherein the instructions are further executable by the one or more processors of the apparatus to periodically grant access to at least some of the additional subsequent user devices based on one or more additional threshold portions, each of the one or more additional threshold portions being greater than preceding threshold portions, until the used portion of the predefined capacity of resources available at the node reaches a maximum portion of the predefined capacity of resources.

15. The apparatus of claim 9, wherein the instructions are further executable by the one or more processors of the apparatus to provide the user devices that have been granted access to the node with a token indicating that the user devices have been granted access to the node.

16. A wireless communication network comprising a plurality of nodes, wherein at least one node comprises an apparatus comprising a non-transitory storage medium and instructions stored in the non-transitory storage medium, the instructions being executable by one or more processors of the apparatus to:
activate the node for service within the wireless communication network, the node having a predefined capacity of resources available at the node;
select, upon the activating, a first threshold portion of the predefined capacity of resources;
grant access to the node user devices until a used portion of the predefined capacity of resources reaches the first threshold portion, and thereafter deny access to subsequent user devices that attempt to access the node for a period of time;
select, after the period of time, a second threshold portion of the predefined capacity of resources that is greater than the first threshold portion; and
grant, after selecting the second threshold portion, access to the node until the used portion of the predefined capacity of resources reaches the second threshold portion, and thereafter deny access to additional subsequent user devices that attempt to access the node.

17. The wireless communication network of claim 16, wherein the first threshold portion is a first number of user devices and the second threshold portion is a second number of user devices.

18. The wireless communication network of claim 16, wherein the first threshold portion is a first percentage of the predefined capacity of resources available at the node and the second threshold portion is a second percentage of the predefined capacity of resources available at the node.

19. The wireless communication network of claim 16, wherein the instructions are further executable by the one or more processors of the apparatus to periodically grant access to at least some of the additional subsequent user devices based on one or more additional threshold portions, each of the one or more additional threshold portions being greater than preceding threshold portions, until the used portion of the predefined capacity of resources available at the node reaches a maximum portion of the predefined capacity of resources.

20. The wireless communication network of claim 16, wherein the instructions are further executable by the one or more processors of the apparatus to provide the user devices that have been granted access to the node with a token indicating that the user devices have been granted access to the node.

* * * * *